July 19, 1938.  M. A. HOPKINS  2,124,455

STORAGE BATTERY VENT PLUG

Filed June 9, 1934

INVENTOR
Mark A. Hopkins
BY
ATTORNEY

Patented July 19, 1938

2,124,455

UNITED STATES PATENT OFFICE 2,124,455

STORAGE BATTERY VENT PLUG

Mark A. Hopkins, Indianapolis, Ind., assignor to Prest-O-Lite Storage Battery Corporation, Indianapolis, Ind., a corporation of Ohio Application June 9, 1934, Serial No. 729,883

8 Claims. (Cl. 137—139)

This invention relates to electric batteries and more particularly to vent plugs for such batteries having liquid electrolytes.

One of the objects of the present invention is to provide a novel vent plug construction for electric batteries which will seal the cell when the battery is tilted beyond a predetermined angle in any direction.

Another object of the present invention is to provide a novel battery vent plug construction which will allow the proper venting of the gases generated in the cell during normal operation, but which will prevent the escape of electrolyte when the battery is tilted, and which is entirely automatic in its operation.

Another object of the present invention is to provide a novel valved vent plug construction which will positively seal a battery cell and prevent the escape of electrolyte when the battery is tilted beyond a predetermined angle in any direction and which is gravity responsive and capable of closing the valve regardless of the direction of movement of the gravity operating mechanism.

Still another object of the present invention is to provide a novel valve-controlled vent plug for electric storage batteries which is simple in construction, easily and economically manufactured, and efficient and positive in its operation.

These and other objects will become more apparent from the following description and drawing, in which like reference characters denote like parts throughout the several views. It is expressly understood, however, that the drawing is for purposes of illustration only and not a definition of the limits of the invention, reference being had for this purpose to the appended claims.

In the drawing:—

In batteries of the type using a liquid electrolyte it is necessary to provide for the venting of the gases that are emitted from the electrolyte, and especially is this true with secondary storage batteries during that phase of the battery cycle in which it is being charged. It is also necessary in some of the commercial uses of such batteries to tilt or sometimes completely turn over the battery which would cause the electrolyte to escape from the cell through the vent plugs, were not some means provided to prevent such escape. One example of such use to which this invention is particularly adapted is that of starting and lighting batteries in aeroplanes where the battery is liable to be oscillated beyond a predetermined angle at which the electrolyte would escape, or even turn completely over.

Figure 1:
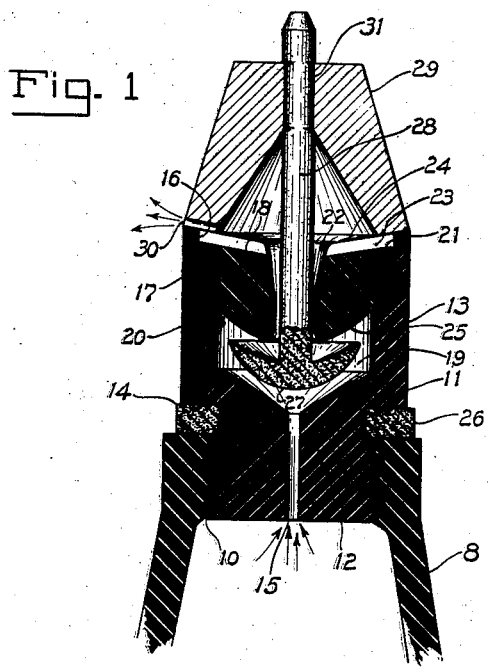
Figure 1 is a sectional view, in elevation, of one form of the invention as applied to a cell of an electric battery.
Figure 2:
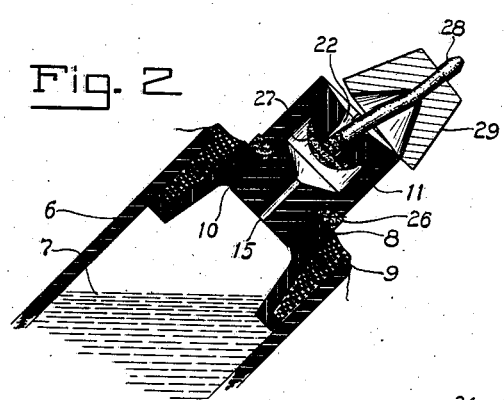
Figure 2 is the same as Fig. 1, with the cell tilted and showing the relation of the elements in this position.
Figure 3:
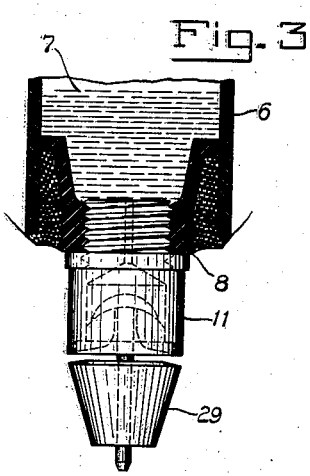
Figure 3 is the same as Fig. 1, with the cell turned 180° from its normal upright position.

In the embodiment of the invention illustrated in Figs. 1, 2 and 3, a cell casing 6 of the usual construction is shown containing an electrolyte 7 and having a cover plate 8 fitted in the casing and held in place by any suitable means, but sealed by means of a filling compound 9. This cover plate 8 is also of usual construction and provided with a threaded aperture 10 for the reception of a plug for filling the cell and venting the gases given off from the electrolyte.

The novel vent plug cooperating with the battery cell and forming the subject matter of the present invention is illustrated in this embodiment as comprising a cylindrical body member 11 having a lower screw-threaded portion 12 for insertion in the screw-threaded aperture of the cover plate 8, and an upper recessed portion of larger diameter forming an annular shell 13; a shoulder 14 being formed between the upper and lower portions due to the difference in outside diameters of the two portions. The lower portion 12 of the body member, constituting a septum, has a central aperture 15 of small diameter for providing a passageway for the escaping gases. In the upper portion of the body member, the annular shell is interiorly recessed, as at 16, to form a seating shoulder, and has a threaded portion 17 below the shoulder.

A plug 18 is provided for closing the upper end of the body member and forming a valve chamber 19 interiorly of the body member and intermediate its ends. To this end, the plug 18 has a screw-threaded portion 20 and a flange 21 for cooperation with the recess 16 and screw thread 17 of the body member, and is centrally apertured, as at 22, the upper face of the plug having a key slot 23 to facilitate the insertion of the plug by turning until the flange 21 is seated on the seating shoulder. When in this position, the top surface of the plug forms a continuous smooth surface 24 with the top edge of the body member. The opposite end of the plug extending into the valve chamber and surrounding the aperture 22 is so shaped as to constitute a valve seat 25 which is illustrated as having a rounded contour but which could be of any desired shape or form. When the body member of the vent plug is inserted in the apertured cell cover, a gasket 26 is provided between the cover plate 8 and the shoulder 14 for sealing the connection, in which position a venting of the gases given off by the electrolyte may take place through the aperture 15, valve chamber 19 and aperture 22, and which may be considered as one aperture for the purpose of this invention.

Within the valve chamber, a mushroom-shaped valve 27 is provided, of the same general contour as the valve seat 25 but having a slightly smaller radius than the valve seat for cooperation therewith and having a valve stem 28 extending upwardly through the aperture 22 but of a lesser diameter than the aperture to allow a free escape of gas therebetween. The valve and stem are preferably integral and composed of a soft elastic and resilient material such as rubber so that the valve may conform itself to the valve seat 25, and so that the valve stem may actuate the valve to a closed position when tensioned, regardless of the direction of the force applied to tension the stem. Further, by the use of such material it has been found that no vibration is transmitted to the valve which would cause a seepage of the electrolyte through the valve and down the stem. However, the valve may be of a more rigid material with a flexible valve stem, or the valve may be flexible and provided with a more rigid valve stem and be within the scope of the present invention.

Mounted on the upper flat continuous surface 24 of the body member 11 and operatively connected with the extended valve stem 28, is an element 29, that is responsive to a tilting of the body member for tensioning the valve stem and actuating the valve to a closed position. In the illustrated embodiment, this tilting responsive element 29 is in the form of a weight that is free to slide or tip about its edge when the cell is tilted beyond a predetermined angle. This weight may be of any material which is resistant to the gases which are given off and of such weight as to properly tension the elastic valve stem and close the valve when tilted beyond a predetermined angle. This element 29 is shown in the form of a hollow truncated cone having perforations 30 to complete a passageway for the gases from the cell to the atmosphere. With this construction, the hollow portion forms an air trap or cavity which retains any electrolyte which escapes from the cell by seepage and traps bubbles resulting from gassing, and returns the electrolyte to the cell when the cell is restored to its normal upright position. To this end, the surface 24 on which the element 29 is freely mounted has a gradually tapering contour toward the aperture 22 to drain the electrolyte so trapped back to the cell.

The valve stem 28 may be fixed to the weighted element 29 in any suitable manner but in the novel construction illustrated, the resilient rubber valve stem is stretched until it is of sufficiently reduced diameter that it may be drawn through the aperture 31 in the weighted element of less diameter than the valve stem in its normal condition. After the valve stem 28 has been drawn through the aperture in the weighted element to its proper position with respect to the weight, the stem is released and the natural resilient expansive force of the rubber will securely fasten the weight to the stem. The proper position of the weight with respect to the valve is such that when the elements are in the position illustrated in Fig. 1, the valve will be held in an open position, but when in the position illustrated in Figs. 2 and 3, the valve will have closed the aperture 22.

In assembly, the valve stem 28 is inserted through aperture 22 of plug 18, and the plug, with the inserted valve and valve stem, is then screwed into shell 13, free access being provided to key slots 23 in order that the plug may be screwed into the shell. The weight 29 is then affixed to the upper end of the valve stem, preferably in the manner described above. The entire assembly may then be screw-threaded into the aperture of cover plate 8.

From the above description, it will be quite apparent that when the cell 6 is in its normal upright position, the gases given off from the electrolyte will be vented through the aperture 15, valve chamber 19, aperture 22 and perforations 30 in the weighted element to the atmosphere. When the cell is tilted beyond a predetermined angle the gravitational force acting upon the weighted element 29 will cause it to slide on the surface 24 or tilt about its edge to tension the resilient valve stem 28 and seat the valve 27 firmly on the valve seat 25 and close the aperture 22. The small aperture 15, together with the valve chamber 19, forms an air trap which retards the entry of electrolyte into the chamber and valve, as the valve closes before the liquid reaches the aperture when the cell is tilted. The valve will remain closed during the entire time that the tilted condition exists and until the cell is brought back to its normal upright position, at which time the gravity responsive element 29 will tilt back to its normal position and again open the valve. The gravity responsive operating element and the valve itself will be actuated when the cell is tilted beyond a predetermined angle in any direction and will not open the valve except when the cell is returned to a nearly horizontal position within the limit of the predetermined angle at which the gravity responsive element is responsive.

Figures 4, 5:
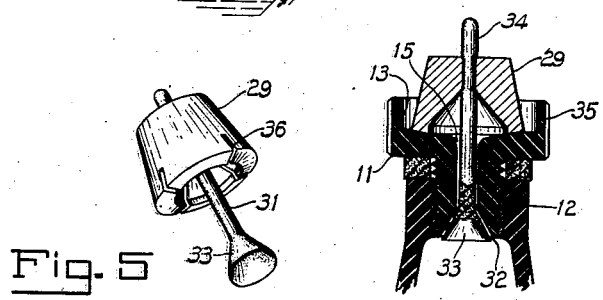
Figure 4 is a view similar to Fig. 1, but showing a modified construction from that of Fig. 1.
Figure 5 is a perspective view of the valve and its operator shown in Fig. 4.

The preferred embodiment of the invention illustrated in Figs. 4 and 5 includes a body member 11, as in the embodiment disclosed in Fig. 1, having a lower screw-threaded portion 12 and an upper recessed portion 13 of greater diameter and provided with an aperture 15. However, in this embodiment, the lower portion of the body member 11 surrounding the aperture 15 has a conical tapered contour constituting a valve seat 32. For cooperation with said valve seat, a valve 33 of a corresponding tapered contour is provided having a valve stem 34 extending upwardly through the aperture 15. A weighted element 29 is fixedly connected to the valve stem in the same manner as described with respect to the construction in Fig. 1, and is normally positioned to hold the valve in an open position with respect to the valve seat 32. Instead of being mounted on the top surface of the plug member 18 and annular shoulder 13, in this embodiment, the weighted element rests in the recessed upper portion of the body member 11 which forms an annular wall 35 for limiting the degree of sliding movement that the element 29 may have. As more clearly shown in Fig. 5, the perforations in the weighted element 29 are formed by slots 36 at the bottom edge of the skirt formed by the hollow perforated cone.

The mode of operation of this embodiment of the invention is substantially the same as that already described, and it will now be apparent to those skilled in the art that many structural changes may be made in the shape, form and materials used, without departing from the spirit of the invention. For instance, the gravity responsive element may have such a shape that it will be operative to close the valve upon a lesser predetermined angle of tilt, or the element may be so formed as to operate only after the cell has been tilted to a greater angle than that illustrated. It is therefore to be understood that a definition of the scope of the invention is to be found only in the appended claims.

What is claimed is:

1. In a vent plug for battery cells, a body member apertured to vent the cells to the atmosphere having a convex seat formed thereon, a valve cooperating with the aperture in the body member and having a valve stem and a concave valve disc adapted to contact said convex valve seat, said valve and stem being composed of a soft resilient and elastic material, and means operatively connected with the valve stem and responsive to a slight tilting of the cell for tensioning the valve stem whereby the cell is sealed when tilted beyond a predetermined angle in any direction.

2. In a vent plug for battery cells, a cylindrical body member having an aperture for venting the cell to the atmosphere, a valve cooperating with the aperture in the body member and having a valve stem extending through the aperture, said valve and stem being composed of soft rubber, and a perforate cup-shaped weighted element mounted for free sliding movement substantially transversely of said cylindrical body member on said body member and connected with the rubber valve stem, said element being normally positioned to hold the valve open to allow escape of gases from the cell through the aperture and perforations in the weighted element but adapted to slide substantially transversely of said cylindrical body member when tilted to tension the rubber stem and actuate the valve to close the aperture.

3. In a vent plug for battery cells, a body member apertured for venting the cell to the atmosphere, a valve cooperating with the aperture in the body member, and a hollow weighted element mounted on the top of the body member and operatively connected with the valve for actuating the same to closed position when the cell is tilted beyond a predetermined angle in any direction, said weighted element having a condensing chamber at the base thereof, and said top of the body member being downwardly inclined toward the aperture to drain electrolyte trapped in the condensing chamber back to the cell.

4. In a vent plug for battery cells, a body member having a valve chamber intermediate its ends, an aperture of small diameter extending from the valve chamber to the bottom of the body member, an aperture of larger diameter extending from the valve chamber to the top of the body member, a valve in the valve chamber having a stem extending upwardly through the larger aperture, and an operator mounted on the top of the body member and operatively connected with the valve stem, said valve chamber and aperture of small diameter constituting an air trap for preventing a free entry of liquid from the cell to the chamber when the valve is closed.

5. In a battery, a cell casing having a top cover apertured to receive a vent plug, a vent plug in the apertured cover comprising a body member having a vertical aperture for venting the cell to the atmosphere, a valve chamber within the body member between its ends and above the cell cover and forming a valve seat around the aperture, a valve within the valve chamber having a stem extending through the aperture, and a gravity-responsive element connected to the valve stem and mounted to slide substantially transversely of said vertical aperture on the body member for actuating the valve to close the aperture when the cell is tilted beyond a predetermined angle in any direction.

6. In a battery, a cell casing having a top cover apertured to receive a vent plug, a vent plug in the cover comprising a body member having an upper annular shell and a lower septum having a single aperture therein, a plug for closing the upper end of said annular shell and forming a valve chamber within the body member, said plug having a central aperture and a protruding end extending into the valve chamber for forming an annular valve seat, a soft resilient and elastic valve in said chamber for cooperation with the valve seat and having an elastic stem extending upwardly through the aperture in said plug, and a hollow weighted element fixed to the valve stem and mounted to slide in a plane substantially parallel to said top cover on the body member, said weighted element being perforate to permit egress of the escaping gases and adapted to normally hold the valve open and to tension said elastic stem to close the valve when tilted beyond a predetermined angle.

7. A valve-controlled vent plug for batteries comprising a body member having a lower portion for insertion in the cover plate of a battery cell and an upper portion of greater diameter centrally recessed to form a wall, said body member being recessed throughout its length and terminating in a tapered valve seat at its lower end, a conical valve for cooperation with the valve seat having a valve stem extending through the aperture, said valve and valve stem being composed of soft rubber, and a weighted element connected to the valve stem and mounted for transverse sliding action in respect of said body member to tension said valve stem, thereby moving said valve into the closed position when said battery cell is tilted a predetermined angle from the vertical.

8. In a vent plug for battery cells, a body member apertured to vent the cell to the atmosphere and provided with a valve seat, a valve cooperating with the aperture in the body member and having a valve stem and a valve disc adapted to contact said valve seat, one of said contacting surfaces being substantially convex and the other substantially concave, said valve stem being composed of a soft resilient and elastic material, and means operatively connected with the valve stem and responsive to a slight tilting of the cell for tensioning the valve stem whereby the cell is sealed when tilted beyond a predetermined angle in any direction.

MARK A. HOPKINS.